(12) United States Patent
Gur et al.

(10) Patent No.: US 10,077,011 B1
(45) Date of Patent: Sep. 18, 2018

(54) VEHICLE UNDERBODY ACOUSTIC PANELS

(71) Applicant: Ford Global Technologies, LLC, Dearborn, MI (US)

(72) Inventors: Yuksel Gur, Ann Arbor, MI (US); David Anthony Wagner, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 15/590,681

(22) Filed: May 9, 2017

(51) Int. Cl.
*B60R 13/08* (2006.01)
*G10K 11/16* (2006.01)

(52) U.S. Cl.
CPC ...... *B60R 13/0815* (2013.01); *B60R 13/0861* (2013.01); *B60R 13/08* (2013.01); *B60R 13/083* (2013.01); *G10K 11/16* (2013.01)

(58) Field of Classification Search
CPC .................. B60R 13/0815; B60R 13/0861
USPC ...................................... 296/39.3
See application file for complete search history.

(56) References Cited

U.S. PATENT DOCUMENTS

| 7,963,363 | B2 | 6/2011 | Niwa et al. |
| 9,579,972 | B2* | 2/2017 | Taniguchi ............ B60K 15/067 |
| 2007/0009726 | A1 | 1/2007 | Wildhaber et al. |
| 2008/0136110 | A1 | 6/2008 | He |
| 2010/0143695 | A1* | 6/2010 | Ogawa .................. B29C 51/004 428/306.6 |
| 2012/0043779 | A1* | 2/2012 | Glickman ........... B60R 13/0861 296/39.3 |

FOREIGN PATENT DOCUMENTS

| CN | 202063094 U | 12/2011 |
| DE | 102008025859 A1 | 12/2008 |
| DE | 102008022652 A1 | 11/2009 |
| WO | 2005113321 A1 | 12/2005 |

* cited by examiner

*Primary Examiner* — Joseph D. Pape
(74) *Attorney, Agent, or Firm* — Jason Rogers; Price Heneveld LLP

(57) ABSTRACT

An acoustic panel for a vehicle includes a floor panel, an underbody acoustic shield, and a perimeter seal positioned between the floor panel and the underbody acoustic shield to form a pocket of trapped air. The pocket of trapped air can further reduce a transmission of noise through the floor panel into the vehicle interior.

19 Claims, 6 Drawing Sheets

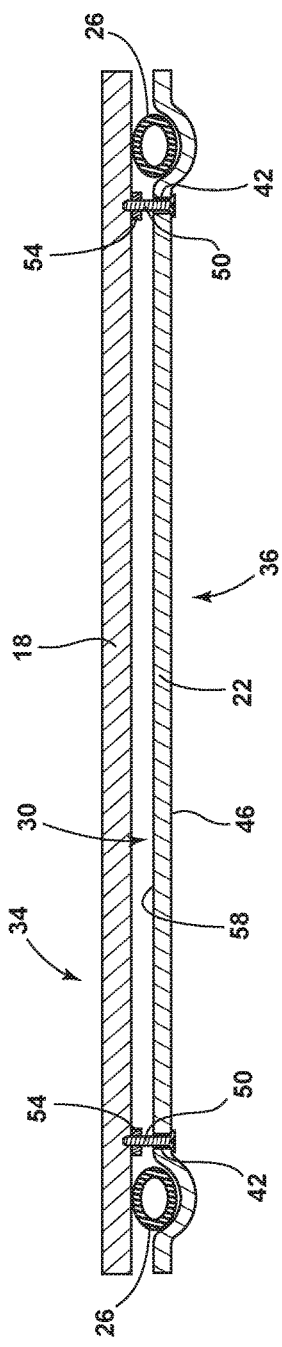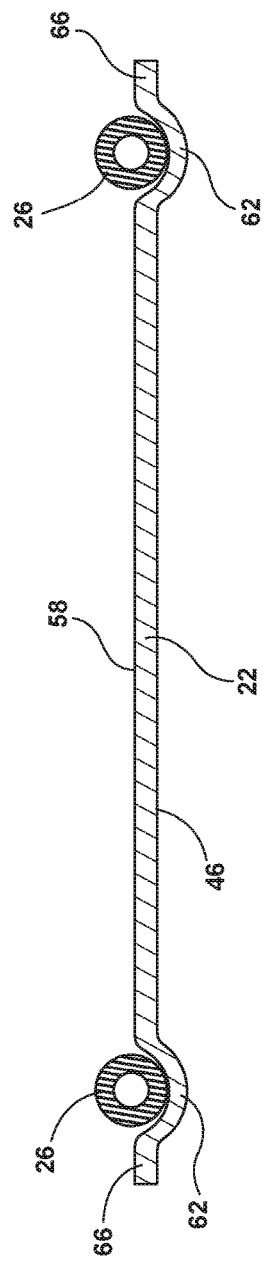

VEHICLE UNDERBODY ACOUSTIC PANELS

FIELD OF THE INVENTION

The present invention generally relates to acoustic panels for automobiles, and more specifically, acoustic panels having a pocket of trapped air to reduce exterior noise (wind noise and tire noise) entering the vehicle resulting in a quieter ride for the occupants of the vehicle.

BACKGROUND OF THE INVENTION

There are multiple sources of sound that can be heard by the occupants in an automobile. Vehicle manufacturers are continually looking to minimize the noise produced inside and outside of a car for its occupants so a variety of different soundproof measures are taken. With regards to the components that generate loud sounds on the vehicle itself, such as engines, transmissions, and driving systems, soundproof measures are typically used in the positions proximate the sound generating sources. With regards to the external environment and noises that are produced by the vehicle moving down the road, paneling, insulation, and other sound reducing materials can be used to dampen or remove the externally produced sounds from reaching the occupants of the vehicle.

Motor vehicles typically contain a vehicle body that includes one or more metal floor panels that define the floor of the passenger compartment. These floor panels are typically covered with a layer of carpeting and/or insulation to provide an aesthetically pleasing environment for the passengers. Since the comfort of the passenger can be enhanced by reducing the permeation of road noise and other external noises from entering the passenger compartment, improved insulation or sound dampening properties along the one or more floor panels is desired. By incorporating or placing layers of sound insulating material proximate the floor panels, the reduction of road noise may be achieved.

The ability to provide new and improved noise reducing materials and/or insulating acoustic panels for minimizing the transmission of road noise through the floor panels of a vehicle into the passenger compartment is desirable and continuously needed for the automotive market.

SUMMARY OF THE INVENTION

According to one aspect of the present invention, an acoustic panel for a vehicle is provided. The acoustic panel includes a floor panel, an underbody acoustic shield, and a perimeter seal positioned between the floor panel and the underbody acoustic shield to form a pocket of trapped air. The pocket of trapped air reduces a transmission of exterior noise through the floor panel.

According to another aspect of the present invention, a method of reducing exterior noise transmission into a vehicle is provided. The method includes forming an acoustic panel by coupling a floor panel to an underbody acoustic shield with a perimeter seal positioned between the floor panel and the underbody acoustic shield to form a pocket of trapped air, and reducing the exterior noise transmission into the vehicle using the pocket of trapped air of the acoustic panel.

According to another aspect of the present invention, an acoustic paneling for a vehicle is provided. The acoustic paneling includes a first wall, an acoustic panel, and a perimeter seal positioned between the first wall and the underbody acoustic shield to form a pocket of trapped air. The pocket of trapped air reduces a transmission of noise through the acoustic panel.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 4 is a cross-sectional view of the acoustic panel of FIG. 2 taken along the line IV-IV according to some embodiments of the present disclosure;

FIG. 5 is a cross-sectional view of the underbody acoustic shield of FIG. 3 coupled to a perimeter seal taken along the line V-V according to some embodiments of the present disclosure;

DETAILED DESCRIPTION OF THE PREFERRED EMBODIMENTS

Figure 1:
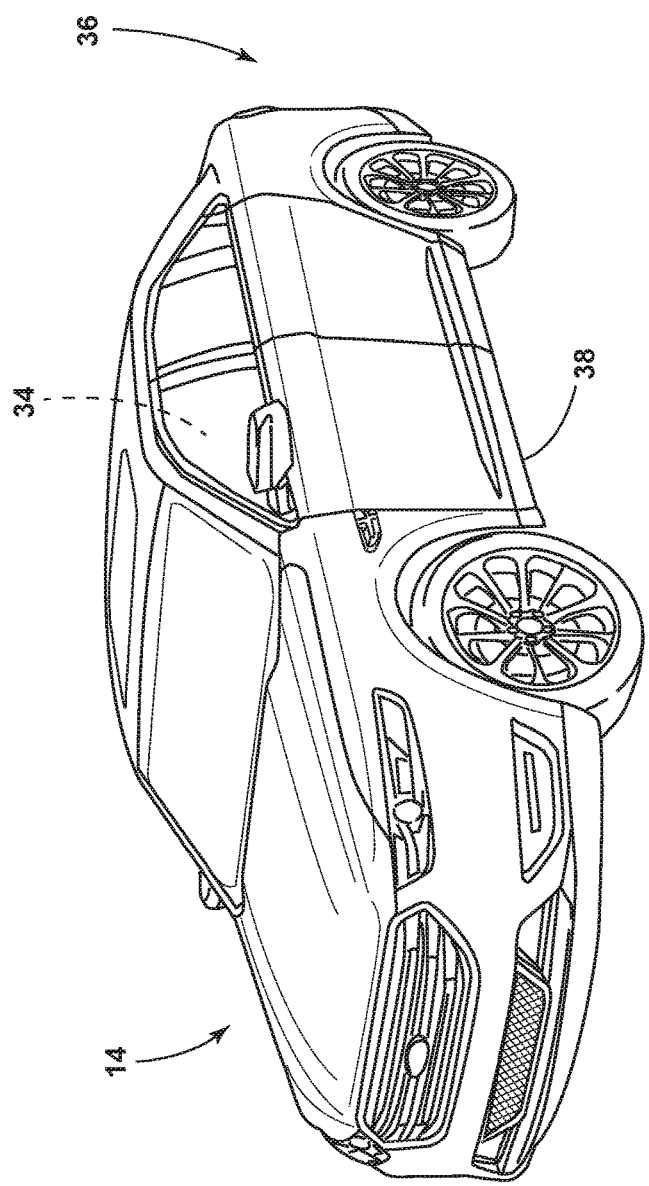
FIG. 1 is a front perspective view of a vehicle having acoustic panels according to some embodiments of the present disclosure.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-5, reference numeral 10 generally designates an acoustic panel for a wheeled motor vehicle 14.

The acoustic panel 10 includes a floor panel 18, an underbody acoustic shield 22, and a perimeter seal 26 positioned between the floor panel 18 and the underbody acoustic shield 22 to form a pocket of trapped air 30. The pocket of trapped air 30 can reduce a transmission of noise through the floor panel 18.

Reducing exterior noise (wind noise, tire noise, etc.) from entering the passenger compartment 34 of the vehicle 14 can be achieved using a dual wall system with the pocket of trapped air 30 positioned between the floor panel 18 and the underbody acoustic shield 22. The airtight pocket of trapped air 30 is created by the perimeter seal 26 coupled to the underbody acoustic shields 22. The perimeter seal 26, when installed, may have at least a two millimeter seal compression to eliminate any air leakage due to suction and/or other forces exerted on the acoustic panel 10 during driving conditions. Creating an airtight cavity or the pocket of trapped air 30 between the floor panel 18 and underbody acoustic shield 22 increases the sound transmission loss imparted by the acoustic panel 10 so less exterior noise can propagate or be transmitted into the interior or passenger compartment 34 of the vehicle 14 resulting in less interior noise and a quieter passenger compartment 34 which can be desired by the occupants of the vehicle 14. An unsealed pocket of trapped air 30 resulting from an improperly formed or incomplete perimeter sealing 26 would not be expected to generate the reduction in exterior noise transmittance into the interior or passenger compartment 34 of the vehicle 14 like an airtight or sealed pocket of trapped air 30 would.

Referring to FIG. 1, the vehicle 14 is shown in an outside environment 36 having a passenger compartment 34 and a vehicle bottom 38. The vehicle 14, is shown as a car although the type of vehicle 14 is not meant to be limiting and the vehicle 14 could additionally be, for example, a minivan, truck, commercial vehicle, or any other wheeled motorized vehicle.

Figure 2:
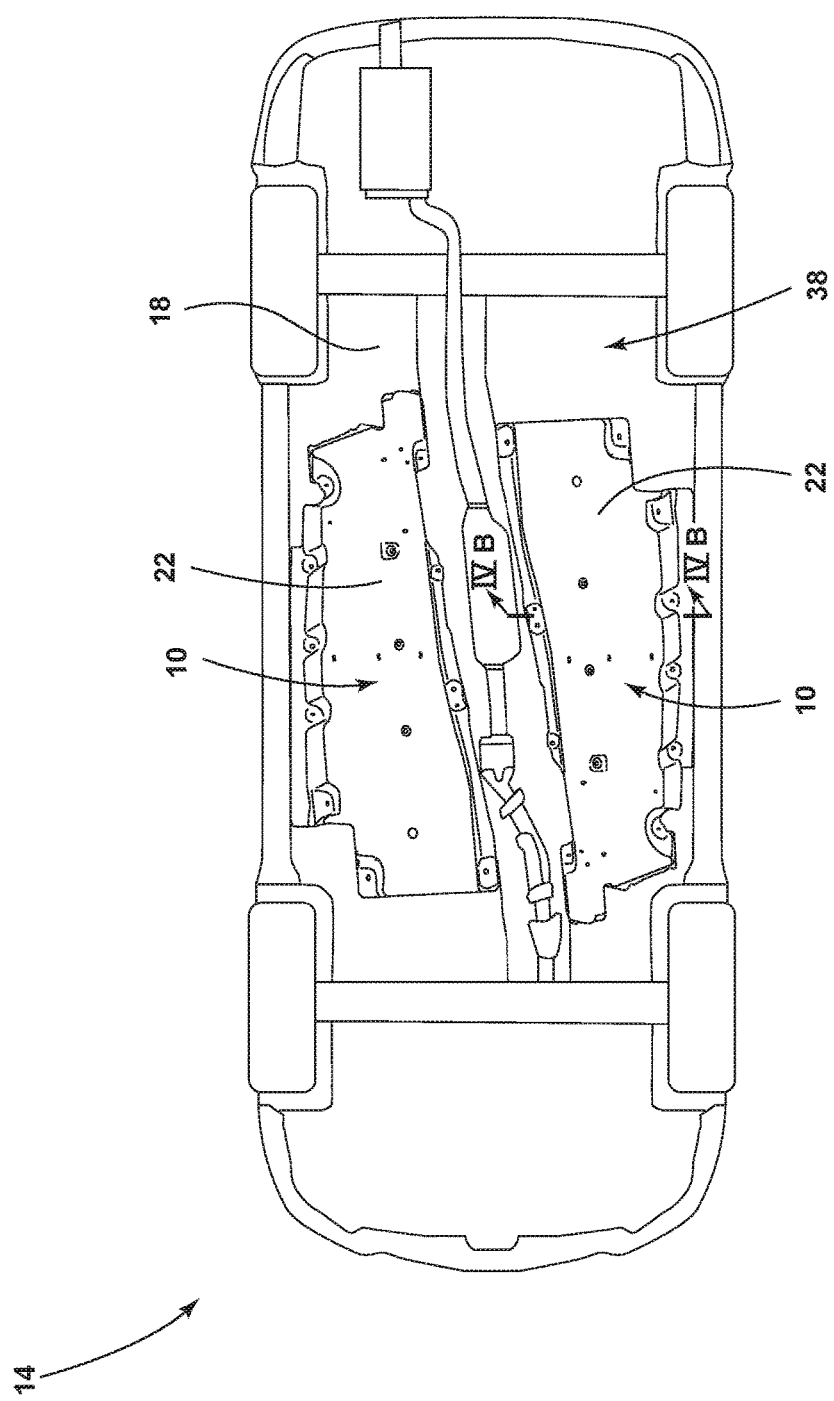
FIG. 2 is a bottom view of the vehicle of FIG. 1 showing underbody acoustic shields and the acoustic panels according to some embodiments of the present disclosure.

Referring now to FIG. 2, a bottom view of the vehicle 14 is shown with the underbody acoustic shields 22 coupled to form the corresponding acoustic panels 10. The vehicle bottom 38 includes the floor panel 18 coupled to the underbody acoustic shield 22 to form the acoustic panel 10.

The acoustic panel 10 of the vehicle 14 has the ability to function as a NVH (Noise, Vibration, and Harshness) management layer and/or structure. The underbody acoustic shield 22 and the pocket of trapped air 30 of the acoustic panel 10 described herein can be used as a lightweight and affordable option to insulate and reduce the noise, vibration, and harshness (NVH) experienced by an occupant in the vehicle 14. In some embodiments, the underbody acoustic shield 22 and pocket of trapped air 30 of the acoustic panel 10 may have a noise reduction coefficient (NRC) defined as the percentage of sound that a surface absorbs and does not reflect or transmit. In some embodiments, the NRC can be from about 5% to about 99%, from about 25% to about 95%, from about 50% to about 95%, from about 75% to about 95%, or has a NRC of about 95%, about 90%, about 85%, about 80%, about 75%, about 70%, about 65%, about 60%, about 50%, about 40%, or about 25%.

Figure 3:
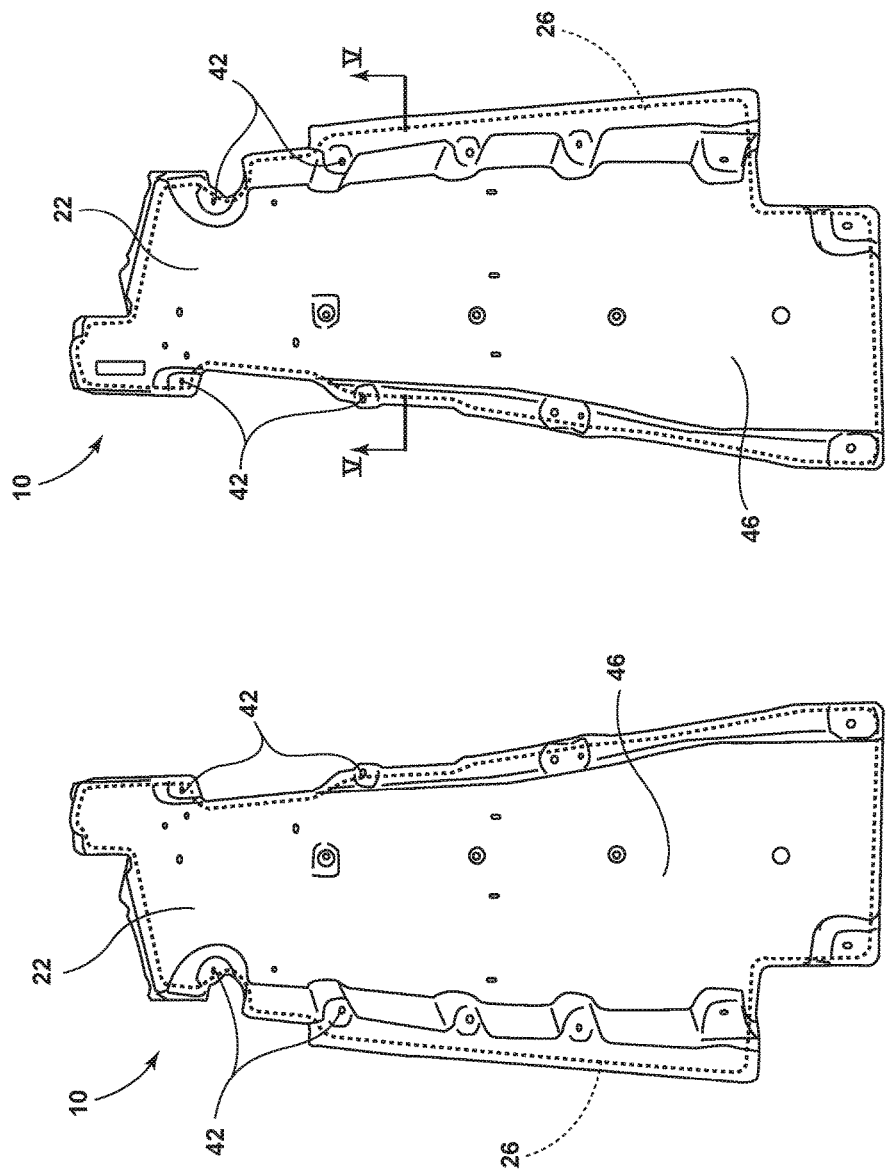
FIG. 3 is a bottom perspective view of the underbody acoustic shields taken from the vehicle of FIG. 2 according to some embodiments of the present disclosure.
Figure 6:
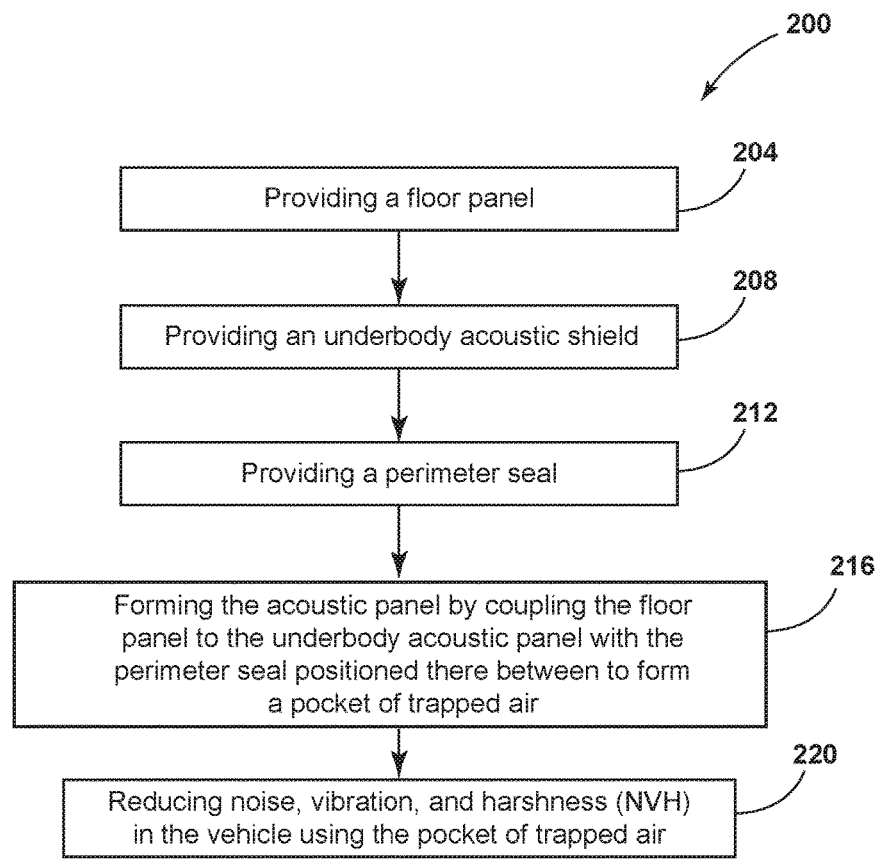
FIG. 6 is a flow diagram of a method for reducing exterior noise transmission into a vehicle according to some embodiments of the present disclosure.

Referring to FIG. 3, the underbody acoustic shields 22 taken from the vehicle 14 of FIG. 2 are shown. The underbody acoustic shields 22 include a plurality of attachment holes 42 positioned along a bottom underbody acoustic shield surface 46. The perimeter seal 26 is positioned along a top underbody acoustic shield surface 58 (shown in FIG. 4). In some embodiments, the underbody acoustic shield 22 has a thickness from about 1 mm to about 20 mm. In some embodiments, the underbody acoustic shield 22 includes polyethylene-co-propylene, polyethylene (including HDPE, LDPE and/or LLDPE) and polypropylene, polyester, polyamide, PVC, nylons, polystyrene, polyphenylene sulfide, polyoxymethylene and polycarbonate, and combinations thereof.

Referring now to FIG. 4, a cross-sectional view of the acoustic panel 10 of FIG. 2 taken along the line IVB-IVB is shown. The acoustic panel 10 includes the floor panel 18 coupled to the underbody acoustic shield 22 through a bolt 50 or attachment means 50 positioned in the attachment hole 42 and coupled to a receiving member 54 on the floor panel 18. In some embodiments, the acoustic panel 10 further includes the attachment means 50 for coupling the underbody acoustic shield 22 to the floor panel 18. The perimeter seal 26 is positioned between the floor panel 18 and the underbody acoustic shield 22 so that the perimeter seal 26 is compressed from about 10% to about 40% of the outer diameter of the perimeter seal 26. In some embodiments, the perimeter seal 26 has an outer diameter from about 5 mm to about 25 mm. In other embodiments, the perimeter seal 26 has an outer diameter from about 10 mm to about 20 mm. In still other embodiments, the perimeter seal 26 may have an outer diameter of about 10 mm, 15 mm, or about 20 mm. In yet other embodiments, the perimeter seal 26 has an outer diameter of about 15 mm. The underbody acoustic shield 22 has the top underbody acoustic shield surface 58 and the bottom underbody acoustic shield surface 46 positioned on the respective sides of its surface. The acoustic panel 10 when assembled separates the passenger compartment 34 from the outside environment 36 of the vehicle 14.

In some embodiments, the perimeter seal 26 has an outer diameter from about 5 mm to about 25 mm and has a compression level from about 10% to about 40% of the outer diameter. In other embodiments, the perimeter seal 26 has an outer diameter of about 15 mm and a compression level of about 3 mm.

Referring now to FIG. 5, a cross-sectional view of the underbody acoustic shield 22 of FIG. 3 coupled to the perimeter seal 26 taken along the line V-V is shown. The underbody acoustic shield 22 is shown having the seal trough 62 with the perimeter seal 26 positioned therein. The perimeter seal 26 and corresponding seal trough 62 circumvent the underbody acoustic shield 22 along the top underbody acoustic shield surface 58. The edge member 66 describes the lip or outermost portion of the underbody acoustic shield 22 positioned outside the area marked by the perimeter seal 26. In some embodiments, the perimeter seal is fabricated from ethylene propylene diene monomer (EPDM) rubber, ethylene propylene rubber (EPR), nitrile, urethane, neoprene, siloxanes, or a combination thereof.

In some embodiments, the perimeter seal 26 is positioned in the seal trough 62 circumventing the boundary surface of the underbody acoustic shield 22. The seal trough 62 may be positioned along the outmost edge portion of the underbody acoustic shield 22 or may be positioned further in. Depending on the application or the desired proportions of the pocket of trapped air 30, the perimeter seal 26 and the corresponding seal trough 62 may be positioned in any continuous line along the boundary of the underbody acoustic shield 22 or a smaller boundary or portion therein.

Referring now to FIGS. 1-6, the method 200 of reducing exterior noise transmission into the vehicle 14 includes forming the acoustic panel 10 by providing the floor panel 18 (step 204), providing the underbody acoustic shield 22 (step 208), and providing the perimeter seal 26 (step 212). The method 200 for forming the acoustic panel 10 further includes coupling the floor panel 18 to the underbody acoustic shield 22 with the perimeter seal 26 positioned between the floor panel 18 and the underbody acoustic shield 22 to form the pocket of trapped air 30 (step 216). The method additionally includes reducing the exterior noise transmission into the vehicle 14 using the pocket of trapped air 30 formed by the acoustic panel 10 (step 220).

It is understood that the descriptions outlining and teaching the acoustic panel 10 previously discussed, which can be used in any combination, apply equally well to the second embodiment, where applicable, further disclosing a method of reducing exterior noise transmission into the vehicle 14.

Figure 7:
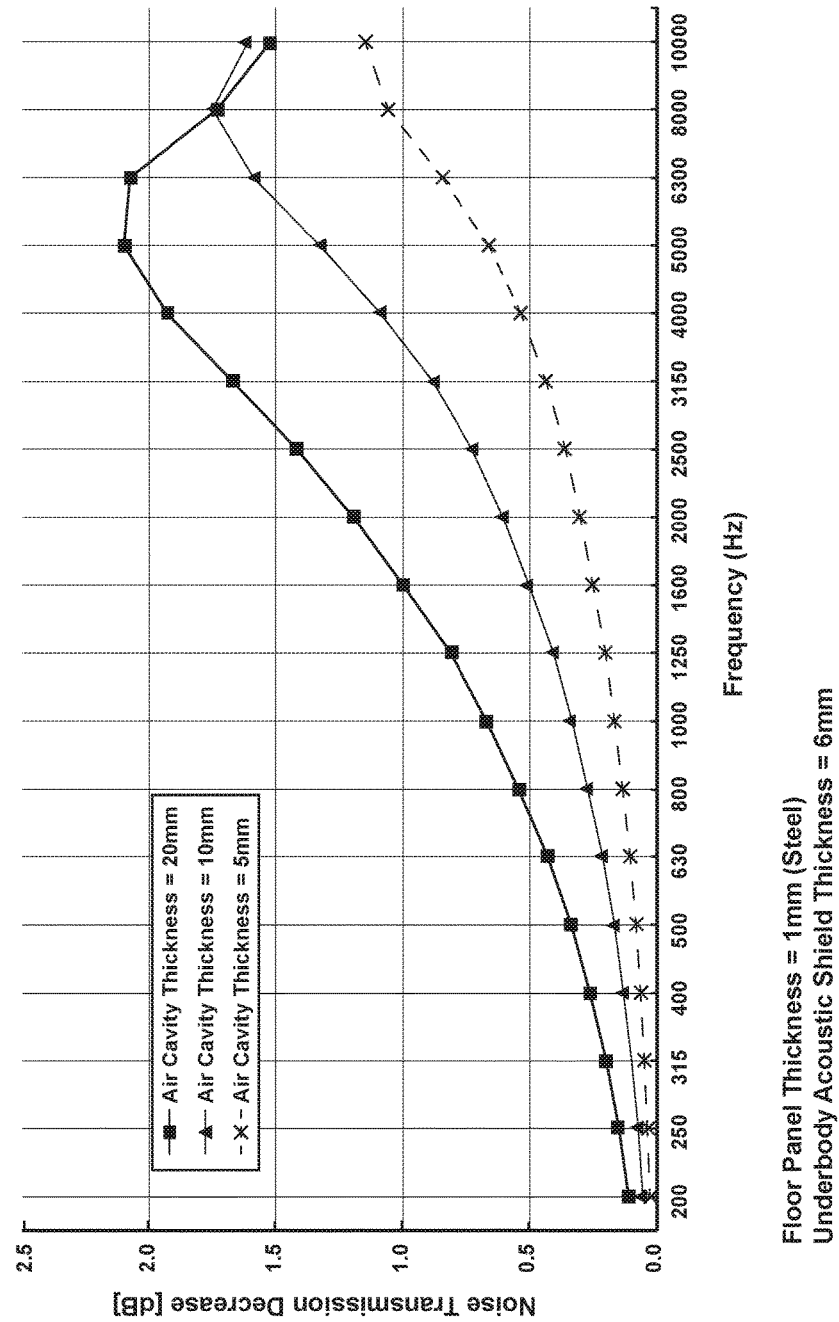
FIG. 7 is a graph demonstrating the effect of the pocket of air in the acoustic panel.

Referring now to FIG. 7, Statistical Energy Analysis (SEA) modelling is an effective Computer Aided Engineering (CAE) design tool to develop NVH sound packages for use in vehicle design. This high frequency NVH CAE tool is used to evaluate the noise transmission performance of the acoustic panel 10. In order to evaluate the effects of the pocket of trapped air 30 positioned between the floor panel 18 and underbody acoustic shield 22, SEA simulations were performed with and without the pocket of trapped air 30 using 1 mm steel for the floor panel 30 and a 6 mm wall thickness for the underbody acoustic shield 22. These simulation results are shown in FIG. 7 for three different pockets of trapped air 30 (20 mm, 10 mm, and 5 mm). FIG. 7 additionally shows the improved noise transmission decrease due to the presence of pockets of trapped air 30 as a function of the ⅓ octave frequencies from 200 Hz to 10000 Hz. Further noise transmission reduction by the pockets of trapped air 30 results in less exterior noise transmission into interior of the vehicle 14 through the acoustic panel 10. Presence of the pocket of trapped air 30 further increases the acoustic performance of acoustic panel 10 by 0.1 dB to 0.3 dB in the low frequency range and/or 1.0 dB to 2.0 dB in the high frequency range. The simulations provided in FIG. 7 indicate that increasing air cavity thickness in the pocket of trapped air 30 decreases the exterior noise transmission into the interior of the vehicle 14 resulting in reduced vehicle 14 interior noise levels which may be desirable to occupants sitting in the passenger compartment 34.

In some embodiments, the pocket of trapped air 30 positioned between the floor panel 18 and the underbody acoustic shield 22 may have a thickness ranging from about 5 mm to about 30 mm, about 5 mm to about 25 mm, about 10 mm to about 30 mm, about 10 mm to about 25 mm, about 15 mm to about 30 mm, about 15 mm to about 25 mm, or about 20 mm to about 30 mm. In other embodiments, the pocket of trapped air 30 may have a thickness of about 5 mm, about 10 mm, about 15 mm, about 20 mm, about 25 mm, about 30 mm, about 35 mm, about 40 mm, or greater than about 20 mm.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

LISTING OF NON-LIMITING EMBODIMENTS

Embodiment A is an acoustic panel for a vehicle, comprising: a floor panel; an underbody acoustic shield; and a perimeter seal positioned between the floor panel and the underbody acoustic shield to form a pocket of trapped air; wherein the pocket of trapped air reduces a transmission of exterior noise through the floor panel.

The acoustic panel for a vehicle of Embodiment A wherein the underbody acoustic shield has a thickness from about 1 mm to about 20 mm.

The acoustic panel for a vehicle of Embodiment A or Embodiment A with any of the intervening features wherein the perimeter seal has a diameter from about 5 mm to about 25 mm.

The acoustic panel for a vehicle of Embodiment A or Embodiment A with any of the intervening features wherein the perimeter seal has a diameter of about 15 mm.

The acoustic panel for a vehicle of Embodiment A or Embodiment A with any of the intervening features further comprising an attachment means for coupling the underbody acoustic shield to the floor panel.

The acoustic panel for a vehicle of Embodiment A or Embodiment A with any of the intervening features wherein the perimeter seal has a diameter from about 5 mm to about 25 mm and has a compression level from about 10% to about 40% of the diameter.

The acoustic panel for a vehicle of Embodiment A or Embodiment A with any of the intervening features wherein the perimeter seal has a diameter of about 15 mm and a compression level of about 3 mm.

The acoustic panel for a vehicle of Embodiment A or Embodiment A with any of the intervening features wherein underbody acoustic shield comprises polyethylene-co-propylene, polyethylene, polypropylene, polyester, polyamide, PVC, nylons, polystyrene, polyphenylene sulfide, polyoxymethylene and polycarbonate, and combinations thereof.

The acoustic panel for a vehicle of Embodiment A or Embodiment A with any of the intervening features wherein the perimeter seal comprises EPDM, nitrile, urethane, neoprene, siloxanes, or a combination thereof.

Embodiment B is a method of reducing exterior noise transmission into a vehicle, the method comprising: forming an acoustic panel by coupling a floor panel to an underbody acoustic shield with a perimeter seal positioned between the floor panel and the underbody acoustic shield to form a pocket of trapped air; and reducing the exterior noise transmission into the vehicle using the pocket of trapped air of the acoustic panel.

The method of Embodiment B wherein the underbody acoustic shield has a thickness from about 1 mm to about 20 mm.

The method of Embodiment B or Embodiment B with any of the intervening features wherein the perimeter seal has a diameter from about 5 mm to about 25 mm.

The method of Embodiment B or Embodiment B with any of the intervening features wherein the perimeter seal has a diameter from about 5 mm to about 25 mm and has a compression level from about 10% to about 40% of the diameter.

The method of Embodiment B or Embodiment B with any of the intervening features wherein underbody acoustic shield comprises polyethylene-co-propylene, polyethylene, polypropylene, polyester, polyamide, PVC, nylons, polystyrene, polyphenylene sulfide, polyoxymethylene and polycarbonate, and combinations thereof.

The method of Embodiment B or Embodiment B with any of the intervening features wherein the perimeter seal comprises EPDM, nitrile, urethane, neoprene, siloxanes, or a combination thereof.

Embodiment C is an acoustic paneling for a vehicle, comprising: a first wall; an acoustic shield; and a perimeter seal positioned between the first wall and the acoustic shield to form a pocket of trapped air; wherein the pocket of trapped air reduces a transmission of noise through the acoustic panel.

The acoustic paneling for a vehicle of Embodiment C wherein the acoustic shield has a thickness from about 1 mm to about 20 mm.

The acoustic paneling for a vehicle of Embodiment C or Embodiment C with any of the intervening features wherein the perimeter seal has a diameter from about 5 mm to about 25 mm and has a compression level from about 10% to about 40% of the diameter.

The acoustic paneling for a vehicle of Embodiment C or Embodiment C with any of the intervening features further comprising: an attachment means for coupling the acoustic shield to the first wall.

The acoustic paneling for a vehicle of Embodiment C or Embodiment C with any of the intervening features wherein the perimeter seal comprises EPDM, nitrile, urethane, neoprene, siloxanes, or a combination thereof.

What is claimed is:

1. An acoustic panel for a vehicle, comprising:
   a floor panel;
   an underbody acoustic shield; and
   a perimeter seal positioned between the floor panel and the underbody acoustic shield to form a pocket of trapped air;
   wherein the pocket of trapped air reduces a transmission of exterior noise through the floor panel and the perimeter seal has an outer diameter from about 5 mm to about 25 mm.

2. The acoustic panel of claim 1, wherein the underbody acoustic shield has a thickness from about 1 mm to about 20 mm.

3. The acoustic panel of claim 1, wherein the perimeter seal has an outer diameter of about 15 mm.

4. The acoustic panel of claim 1, further comprising:
   an attachment means for coupling the underbody acoustic shield to the floor panel.

5. The acoustic panel of claim 1, wherein the perimeter seal has a compression level from about 10% to about 40% of the outer diameter.

6. The acoustic panel of claim 1, wherein the perimeter seal has an outer diameter of about 15 mm and a compression level of about 3 mm.

7. The acoustic panel of claim 1, wherein the underbody acoustic shield comprises polyethylene-co-propylene, polyethylene, polypropylene, polyester, polyamide, PVC, nylons, polystyrene, polyphenylene sulfide, polyoxymethylene and polycarbonate, or combinations thereof.

8. The acoustic panel of claim 1, wherein the perimeter seal comprises EPDM, nitrile, urethane, neoprene, siloxanes, or a combination thereof.

9. A method of reducing exterior noise transmission into a vehicle, the method comprising:
   forming an acoustic panel by coupling a floor panel to an underbody acoustic shield with a perimeter seal positioned between the floor panel and the underbody acoustic shield to form a pocket of trapped air; and
   reducing the exterior noise transmission into the vehicle using the pocket of trapped air of the acoustic panel;
   wherein the perimeter seal has an outer diameter from about 5 mm to about 25 mm.

10. The method of claim 9, wherein the underbody acoustic shield has a thickness from about 1 mm to about 20 mm.

11. The method of claim 9, wherein the outer diameter is about 15 mm.

12. The method of claim 9, wherein the perimeter seal has a compression level from about 10% to about 40% of the outer diameter.

13. The method of claim 9, wherein the underbody acoustic shield comprises polyethylene-co-propylene, polyethylene, polypropylene, polyester, polyamide, PVC, nylons, polystyrene, polyphenylene sulfide, polyoxymethylene and polycarbonate, or combinations thereof.

14. The method of claim 9, wherein the perimeter seal comprises EPDM, nitrile, urethane, neoprene, siloxanes, or a combination thereof.

15. An acoustic paneling for a vehicle, comprising:
a first wall;
an acoustic shield; and
a perimeter seal positioned between the first wall and the acoustic shield to form a pocket of trapped air;
wherein the pocket of trapped air reduces a transmission of noise through the acoustic panel and the perimeter seal has an outer diameter from about 5 mm to about 25 mm.

16. The acoustic panel of claim 15, wherein the acoustic shield has a thickness from about 1 mm to about 20 mm.

17. The acoustic panel of claim 15, wherein the perimeter seal has a compression level from about 10% to about 40% of the outer diameter.

18. The acoustic panel of claim 15, further comprising:
an attachment means for coupling the acoustic shield to the first wall.

19. The acoustic panel of claim 15, wherein the perimeter seal comprises EPDM, nitrile, urethane, neoprene, siloxanes, or a combination thereof.

* * * * *